(12) United States Patent
Elshafie et al.

(10) Patent No.: US 11,929,811 B2
(45) Date of Patent: Mar. 12, 2024

(54) CHANNEL STATE INFORMATION REPORT CANCELLATION

(71) Applicant: QUALCOMM Incorporated, San Diego, CA (US)

(72) Inventors: Ahmed Elshafie, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/478,630

(22) Filed: Sep. 17, 2021

(65) Prior Publication Data

US 2023/0093523 A1    Mar. 23, 2023

(51) Int. Cl.
*H04W 72/04* (2023.01)
*H04B 7/06* (2006.01)
*H04W 72/20* (2023.01)

(52) U.S. Cl.
CPC ......... *H04B 7/0658* (2013.01); *H04B 7/0626* (2013.01); *H04W 72/20* (2023.01)

(58) Field of Classification Search
CPC .. H04B 7/0626; H04B 7/0639; H04B 7/0658; H04B 7/06954; H04W 72/20; H04W 72/40
See application file for complete search history.

(56) References Cited

U.S. PATENT DOCUMENTS

| | | | | |
|---|---|---|---|---|
| 2022/0046604 A1* | 2/2022 | Zhang | ................... | H04L 5/0037 |
| 2022/0124807 A1* | 4/2022 | Hu | ..................... | H04W 74/006 |
| 2022/0416969 A1* | 12/2022 | Lee | ........................ | H04L 5/0048 |
| 2023/0095061 A1* | 3/2023 | Son | ........................ | H04W 24/10 370/252 |
| 2023/0208490 A1* | 6/2023 | Kim | ..................... | H04L 25/021 370/329 |

* cited by examiner

*Primary Examiner* — Phuc H Tran
(74) *Attorney, Agent, or Firm* — Holland & Hart LLP

(57) ABSTRACT

Methods, systems, and devices for wireless communications at a first user equipment (UE) are described. The first UE may receive, from a second UE over a sidelink channel, a first channel state information report, a second channel state information report, and a first transmission configuration indicator, The first UE may select at least one of the first channel state information report or the second channel state information report to be canceled based on receiving an indication associated with the first transmission configuration indicator. The first UE may cancel information included in at least one of the first channel state information report or the second channel state information report based at least in part on the selecting. The first UE may receive a data transmission based at least in part on the cancelling.

28 Claims, 13 Drawing Sheets

First CSI Report 320

Second CSI Report 325

PSFCH Transmission 330

Additional CSI Reports 335

300

CHANNEL STATE INFORMATION REPORT CANCELLATION

FIELD OF TECHNOLOGY

The following relates to wireless communications at a first user equipment (UE), including channel state information report cancellation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support channel state information report cancellation. Generally, the described techniques provide for methods for cancelling channel state information reports in various scenarios. In some examples, wireless devices may detect and report information about quality or states of channels. But other different approaches for such detection and reporting may be deficient. A wireless device, which may be a user equipment (UE), may receive (e.g., from a second UE over a sidelink channel) a first channel state information report, a second channel state information report, and a first transmission configuration indicator. The UE may select one or more of the first channel state information report or the second channel state information report to be canceled based at least in part on receiving an indication associated with the first transmission configuration indicator. The UE may cancel information included in at least one of the first channel state information report or the second channel state information report based at least in part on the selecting. In some examples, the UE may receive a data transmission, for example from a second UE or a base station, based at least in part on the cancelling.

A method for wireless communications at a first user equipment (UE) is described. The method may include receiving, from second UE over a sidelink channel, a first channel state information report, a second channel state information report, and a first transmission configuration indicator, selecting at least one of the first channel state information report or the second channel state information report to be canceled based on receiving an indication associated with the first transmission configuration indicator, cancelling information included in at least one of the first channel state information report or the second channel state information report based on the selecting, and receiving a data transmission based on the cancelling.

An apparatus for wireless communications at a first UE is described. The apparatus may include a processor, memory coupled with the processor, and instructions stored in the memory. The instructions may be executable by the processor to cause the apparatus to receive, from second UE over a sidelink channel, a first channel state information report, a second channel state information report, and a first transmission configuration indicator, select at least one of the first channel state information report or the second channel state information report to be canceled based on receiving an indication associated with the first transmission configuration indicator, cancel information included in at least one of the first channel state information report or the second channel state information report based on the selecting, and receive a data transmission based on the cancelling.

Another apparatus for wireless communications at a first UE is described. The apparatus may include means for receiving, from second UE over a sidelink channel, a first channel state information report, a second channel state information report, and a first transmission configuration indicator, means for selecting at least one of the first channel state information report or the second channel state information report to be canceled based on receiving an indication associated with the first transmission configuration indicator, means for cancelling information included in at least one of the first channel state information report or the second channel state information report based on the selecting, and means for receiving a data transmission based on the cancelling.

A non-transitory computer-readable medium storing code for wireless communications at a first UE is described. The code may include instructions executable by a processor to receive, from second UE over a sidelink channel, a first channel state information report, a second channel state information report, and a first transmission configuration indicator, select at least one of the first channel state information report or the second channel state information report to be canceled based on receiving an indication associated with the first transmission configuration indicator, cancel information included in at least one of the first channel state information report or the second channel state information report based on the selecting, and receive a data transmission based on the cancelling.

Some examples of the method, apparatuses, and non-transitory computer-readable medium described herein may further include operations, features, means, or instructions for transmitting, to the second UE, a cancellation message that indicates that at least one of the first channel state information report or the second channel state information report may be canceled.

In some examples of the method, apparatuses, and non-transitory computer-readable medium described herein, cancelling at least one of the first channel state information report or the second channel state information report may include operations, features, means, or instructions for cancelling the first channel state information report, where the indication includes the second channel state information report.

In some examples of the method, apparatuses, and non-transitory computer-readable medium described herein, the second channel state information report may be associated with a channel state that may be more recent than a channel state associated with the first channel state information report.

In some examples of the method, apparatuses, and non-transitory computer-readable medium described herein, the first channel state information report and the second channel state information report may be received within a duration of the first transmission configuration indicator.

Some examples of the method, apparatuses, and non-transitory computer-readable medium described herein may further include operations, features, means, or instructions for receiving, from the second UE, a second transmission configuration indicator associated with the second channel state information report and a third transmission configuration indicator including information included in the first transmission configuration indicator and cancelling the second channel state information report, where the first channel state information report may be associated with the first transmission configuration indicator and the indication includes the third transmission configuration indicator.

In some examples of the method, apparatuses, and non-transitory computer-readable medium described herein, scheduling transmission of a feedback message to be transmitted after receiving the first channel state information report and the second channel state information report, receiving control information scheduling transmission of a third channel state information report to be received by the UE after the transmission of the feedback message, and cancelling the first channel state information report and the second channel state information report based on receiving the control information.

In some examples of the method, apparatuses, and non-transitory computer-readable medium described herein, the indication includes a most-recently received indication.

Some examples of the method, apparatuses, and non-transitory computer-readable medium described herein may further include operations, features, means, or instructions for receiving power control information associated with at least one of the first channel state information report or the second channel state information report, where receiving the data transmission may be based on receiving the power control information.

In some examples of the method, apparatuses, and non-transitory computer-readable medium described herein, the first transmission indicator may be associated with a first transmission configuration indicator state and the method, apparatuses, and non-transitory computer-readable medium may include further operations, features, means, or instructions for receiving a second transmission configuration indicator associated with a second transmission configuration indicator state and where cancelling at least one of the first channel state information report or the second channel state information report includes cancelling one or more portions of at least one of the first channel state information report or the second channel state information report based on the first transmission configuration indicator state and the second transmission configuration indicator state.

In some examples of the method, apparatuses, and non-transitory computer-readable medium described herein, the indication includes a sidelink data transmission.

In some examples of the method, apparatuses, and non-transitory computer-readable medium described herein, the indication includes a sidelink feedback transmission.

In some examples of the method, apparatuses, and non-transitory computer-readable medium described herein, the indication includes a cancellation message that indicates that at least one of the first channel state information report or the second channel state information may be canceled and cancelling the information may be based on the cancellation message.

DETAILED DESCRIPTION

Figure 1:
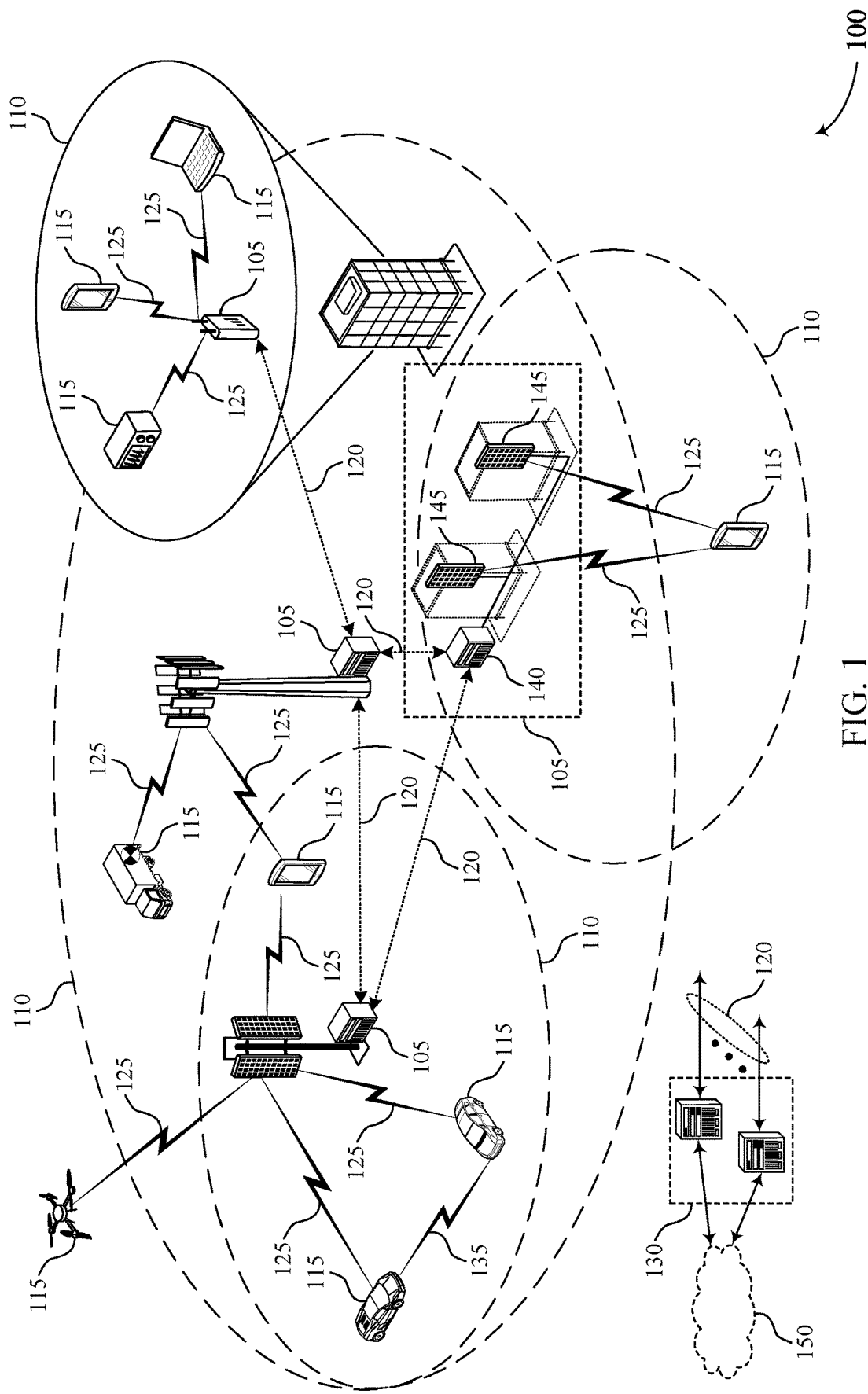
FIG. 1 illustrates an example of a wireless communications system that supports channel state information (CSI) report cancellation in accordance with aspects of the present disclosure.

In wireless communications, wireless devices often detect and report information about quality or states of channels, such as transmission channels. A wireless device (e.g., a user equipment (UE)) may receive one or more indications of channel state information (CSI) (e.g., a CSI report) from another wireless device, and the wireless device (e.g., a UE) may make one or more determinations based on the received CSI. In some examples, a wireless device may transmit one or more transmission control indicators (TCIs) that may contain parameters for configuring quasi co-location (QCL), among other things. In some examples, the use of QCL between multiple antenna ports may be used to aid in various procedures (e.g., channel estimation, frequency offset estimation, synchronization, other procedures). Such information may also support reception of various signals, including data transmissions, control signaling, reference signaling, or other signals, or any combination. However, changes in QCL or TCI, among other aspects, may mean that one or more CSI reports previously received are inaccurate or are no longer applicable for the wireless device.

To improve accuracy and relevance of CSI transmissions, a wireless device may cancel one or more CSI reports that are no longer accurate or applicable to an updated TCI/QCL state. Cancellation of one or more CSI reports may include various different cancellation scenarios, in which one or more different CSI reports may be cancelled based on various factors. In some examples, a later-received CSI report may essentially cancel an earlier-received CSI report so the earlier CSI report may be cancelled. In some examples, a TCI/QCL change may occur, and a second TCI/QCL change may also occur, and a wireless device may return to a TCI/QCL state that is similar to the initial TCI/QCL state. As such, an earlier-received CSI report may effectively cancel a later-received CSI report, because the earlier-received CSI report may be more applicable to the most current TCI/QCL state, so the later CSI report may be cancelled. In some examples, however, some elements of a canceled CSI report (e.g., a power control indication) may still be applicable to be used by a wireless device, such as a TCI/QCL state, because those elements may not expire as quickly as other elements of a canceled CSI report or may still be relevant and applicable. Additionally, cancellation of CSI reports may also be dependent on particular transitions of TCI/QCL states. For example, a transition from a first TCI state (e.g., TCI state "X") to a second TCI state (e.g., TCI state "Y") may not trigger a cancellation, whereas a transition from the first TCI state (e.g., TCI state "X") to a third TCI state (e.g., TCI state "Z") may trigger a cancellation. Further, in some examples, a wireless device may cancel certain portions of a CSI based on such TCI/QCL state transitions.

Aspects of the disclosure are initially described in the context of wireless communications systems. Aspects of the disclosure are then described with reference to an example system, example CSI report cancellation schemes, and a process flow. Aspects of the disclosure are further illustrated by and described with reference to apparatus diagrams, system diagrams, and flowcharts that relate to channel state information report cancellation.

FIG. 1 illustrates an example of a wireless communications system 100 that supports channel state information report cancellation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the course of communications, a UE 115 may transmit or receive one or more reports about one or more conditions associated with the communications. For example, a UE 115 may transmit or receive one or more CSI reports (e.g., to another UE), which may include CSI. In some cases (e.g., depending on the circumstances), a UE 115 may cancel one or more CSI reports, because the CSI reports may no longer be relevant (e.g., due to changed conditions). Thus, rules, procedures, or operations may be defined for cancelling one or more CSI reports that are not otherwise applicable to a condition or a situation. In some examples, the UE 115 may receive or transmit an indication upon which the UE or another wireless device may base a cancellation of one or more CSI reports. In some examples, the UE 115 may cancel an entire CSI report, or may cancel a portion of the CSI report (e.g., some or all information in a CSI report). In some examples, the UE 115 may transmit or receive a data transmission as a result of or based on cancelling the one or more CSI reports or one or more portions of one or more CSI reports). In this way, the UE 115 may use updated CSI reports and cancel unneeded or no-longer-relevant CSI reports.

Figure 2:
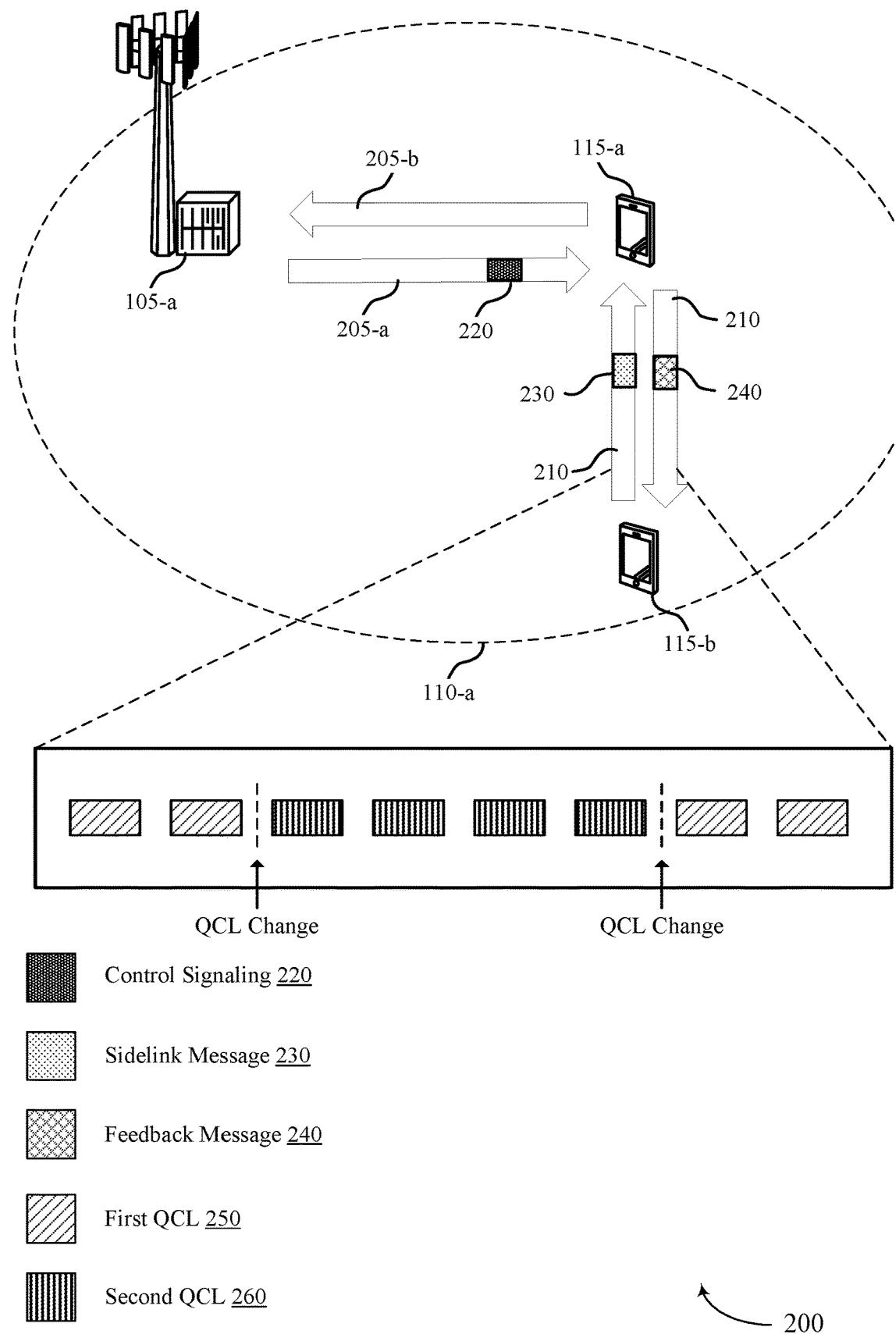
FIG. 2 illustrates an example of a system that supports channel state information report cancellation in accordance with aspects of the present disclosure.

FIG. 2 illustrates an example of a system 200 that supports channel state information report cancellation in accordance with aspects of the present disclosure. The wireless communications system 200 may include UE 115-*a* and UE 115-*b* that may be examples of the UEs 115 discussed in relation to FIG. 1. In some examples, the base station 105-*a* and the UE 115-*a* may be located in a geographic coverage area 110-*a*. The base station 105-*a* may communicate with the UE 115-*a* via one or more downlink communication links 205-*a* and one or more uplink communication links 205-*b*.

In some examples, the UE 115-*b* may be located outside of the geographic coverage area 110-*a*, while in other examples, the UE 115-*b* may be located inside of the geographic coverage area 110-*a*. In some examples, UE 115-*a* may communicate with UE 115-*b* via one or more sidelink communication links 210. In some examples, the UE 115-*a* may be within the geographic coverage area 110-*a* of the base station 105-*a* while communicating with the UE 115-*b* (e.g., sidelink mode 1), and in other examples, the UE 115-*a* may be outside of the geographic coverage area 110-*a* of the base station 105-*a* while communicating with the UE 115-*b* (e.g., sidelink mode 2). In some examples, the base station 105-*a* may transmit control signaling 220 to the UE 115-*a* to coordinate or manage wireless communication with the base station 105-*a* or another wireless device.

In some examples, the UE 115-*b* may transmit one or more sidelink messages 230 to the UE 115-*a* (e.g., one or more CSI reports, one or more TCIs, one or more data transmissions, any combination thereof), and the UE 115-*a* may transmit one or more feedback messages 240 (e.g., feedback messages transmitted over a physical sidelink feedback channel (PSFCH)) to the UE 115-*b* (e.g., a feedback message associated with the one or more sidelink messages 230, that may include feedback about the one or more sidelink messages 230).

In some examples, the UE 115-*b* may transmit or receive one or more TCIs that may contain parameters for configuring QCL, among other things. In some examples, the use of QCL between multiple antenna ports may be used to aid in various procedures (e.g., channel estimation, frequency offset estimation, synchronization, other procedures). Such information may also support reception of various signals, including data transmissions, control signaling, reference signaling, or other signals. For example, if two antenna ports are defined as being QCLed in terms of delay spread, then the UE 115-*b* or other wireless device may determine the delay spread from one port and apply the results for the other antenna port. In some examples, the UE 115-*b* may implement similar procedures for other parameters, including doppler shift, doppler spread, average delay, other parameters, or any combination thereof. In this way, the UE 115-*b* or other wireless device may support the transmission or reception of various signals, including data transmissions, control transmissions, reference signal transmissions, other signals, or any combination thereof.

In some examples, a configuration, such as an RRC configuration, may specify a number of TCI states for various scenarios. For example, such a configuration may specify 128 TCI states for data transmissions and up to 64 TCI states for control transmissions. In some examples, a control message may indicate a TCI state (e.g., to the UE 115-*a*). In some examples, such a TCI state may include parameters for configuring a QCL relationship. In some examples, a number of QCL relationships may be described, configured, or indicated for at least some TCI states if not each TCI state. In some examples, different QCL types may be used for different reference signals.

In some examples, a transmitting UE (e.g., the UE 115-*b*) may transmit or indicate QCL information to the receiving UE (e.g., the UE 115-*a*). In some examples, multiple options or modes of operations may be considered (e.g., Mode 1 operation and Mode 2 operation). In some examples, Mode 1 may be based on a TCI state. For example, a few TCI states may be configured for or indicated to the receiving UE (e.g., UE 115-*a*), and the transmitting UE (UE 115-*b*) may indicate one or more particular TCI states to the receiving UE. The receiving UE may retrieve a corresponding channel profile (e.g., a profile that may include or be associated with large scale channel properties). Additionally or alternatively, a second mode (e.g., Mode 2) may be utilized. In some examples, in Mode 2, the transmitting UE 115-*b* may indicate a change in QCL (e.g., whether the QCL has changed between consecutive transmissions or not). For example, and as shown in FIG. 2, the first QCL 250 may be applicable for the first two transmissions, a QCL change may occur, and then the second QCL 260 may be applicable. After a period, another QCL change may occur, and the first QCL 250 may again be applicable or relevant. Various scenarios of QCL changes are contemplated by this disclosure, and the disclosure is not limited to the scenario depicted in FIG. 2.

In some examples, if the QCL change indication is indicated via sidelink control information (SCI) (e.g., SCI 2), the SCI may include one or more bits to indicate one of two QCL states. The UE 115-*a* (or other receiving wireless device) may determine or identify whether a QCL has been changed by comparing the QCL indicated in two SCIs (e.g., consecutive or non-consecutive SCIs). In other words, if the QCL change indication is toggled/changed (e.g., from 0 to 1 or 1 to 0), then the UE 115-*a* may determine that the QCL state has been changed relative to one or more previous transmissions. In some examples, the UE 115-*a* or other device may re-obtain one or more second order channel statistics.

Generally speaking, CSI reports may aid communication in various ways. For example, CSI associated with physical sidelink shared channel (PSSCH) transmissions may reduce or avoid distortion at a receiving UE (e.g., the UE 115-*a*) in MU-MIMO scenarios by controlling the two transmitting UE's (e.g., the UE 115-*b*) power levels. Further, CSI may also be helpful in scenarios involving link adaptation to change a modulation coding scheme (MCS). For example, a UE may reserve one or more future resources for retransmission of a current transport block.

However, in some examples, CSI reports initially made for a first set of conditions may no longer apply at a later time (e.g., if one or more conditions have changed since the CSI report was made or since one or more measurements were collected). For example, if the time between computing the CSI from a PSSCH transmission (e.g., a case involving mini-slots or sub-slots of slots present) and the PSFCH transmission (or PSSCH resources) is relatively long, the CSI might be irrelevant or inapplicable. For example, if a current QCL expires, a first CSI report may be irrelevant or inapplicable. Further, if a QCL indication expires (e.g., if a new TCI state has started) before a CSI carrier such as a PSFCH transmission may be transmitted, the first CSI report may need to be canceled.

Thus, one or more CSI reports associated with a TCI or a QCL may be canceled partially or fully (e.g., since they are no longer relevant or applicable), and rules, procedures, or operations may be defined or described herein to address such cancellation of CSI reports.

Figure 3:
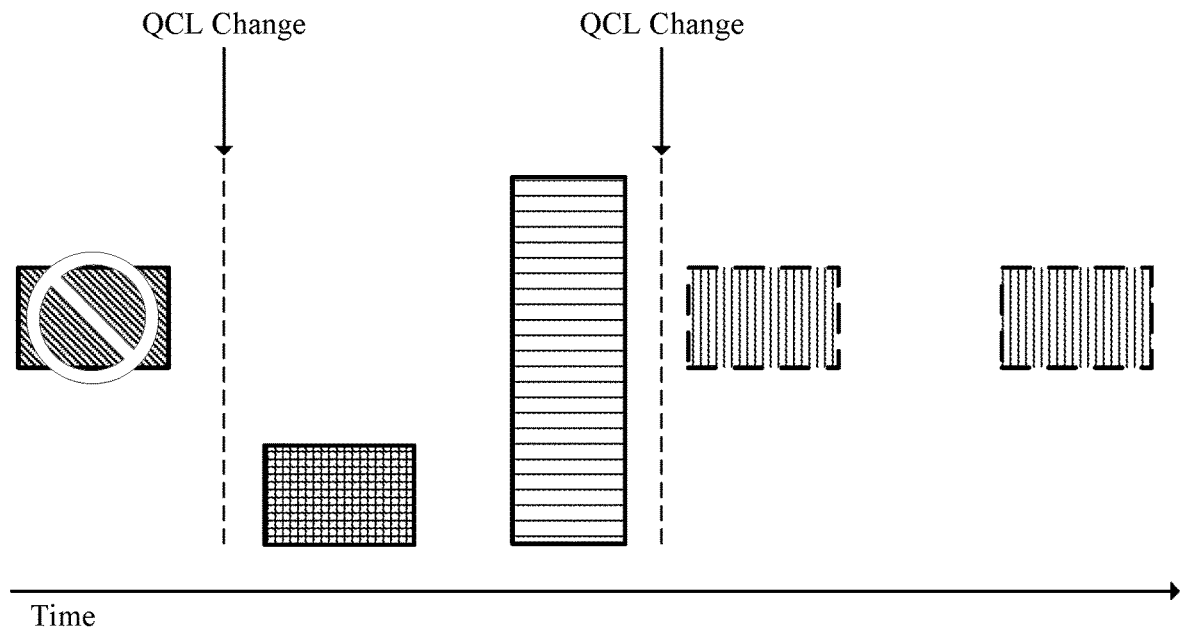
FIG. 3 illustrates an example of a CSI report cancellation scheme that supports channel state information report cancellation in accordance with aspects of the present disclosure.
Figure 3:
Figure 3:
Figure 3:
Figure 3:

FIG. 3 illustrates an example of a CSI report cancellation scheme 300 that supports channel state information report cancellation in accordance with aspects of the present disclosure. In the CSI report cancellation scheme 300, a UE may receive a first CSI report 320, a second CSI report 325, or both, and the UE may transmit a PSFCH transmission 330 that may report feedback associated with one or more of the first CSI report 320 or the second CSI report 325. In some examples, the first CSI report 320 and the second CSI report 325 may be associated with one or more transmissions from a transmitting UE to the receiving UE. In some examples, the additional CSI reports 335 may be associated with regular transmissions (e.g., periodic) or irregular transmissions (e.g., aperiodic) from the transmitting UE to the receiving UE (e.g., transmissions made over a PSSCH). The additional CSI reports 335 may indicate or transmit updates to previously indicated or transmitted CSI reports (e.g., the first CSI report 320 or the second CSI report 325) or may indicate or transmit new channel conditions or states based on one or more changes in such conditions or states. Additionally or alternatively, the additional CSI reports 335 may be associated with one or more additional PSFCH transmissions that may follow or may be associated with the PSFCH transmission 330. Such additional CSI reports 335 may be subject to similar cancellation procedures or rules as described herein in relation to the first CSI report 320, the second CSI report 325, or other CSI reports.

In the scenario depicted in FIG. 3, the first CSI report 320 may be canceled by or expired based on the second CSI report 325. For example, if two PSSCH transmissions (e.g., transmissions associated with the first CSI report 320 and the second CSI report 325) have the same or different QCL indications or TCI states (and, optionally, are transmitted by the same UE), the first CSI report 320 may be canceled by or expire based on the second CSI report 325. Alternatively, such a scenario may be characterized as or implemented in a manner in which the second PSSCH transmission cancels or expires the first PSSCH transmission, similar to the cancellation of the CSI reports.

In some examples, a QCL indication or TCI state may last for a length including multiple PSSCH transmission occasions (e.g., several PSSCH occasions have the same QCL indication or TCI state). In some such examples, a most-recent CSI (e.g., a CSI computed or selected based on a latest PSSCH transmission, which may be the second CSI report 325) may cancel one or more earlier CSI reports. Additionally or alternatively, a CSI report that may take a more updated channel state into account may cancel or expire an earlier CSI. For example, if the second CSI report 325 takes one or more changes in the channel state into account, the second CSI report 325 may be more applicable or desirable to use for the current communication conditions due to being more accurate (e.g., applicable), and the second CSI report 325 may cancel or expire the first CSI report 320.

In some examples, instead of fully cancelling a CSI report, some information associated with a CSI report, such as the first CSI report 320, may still be transmitted. Such information may be information, parameters, or measurements that may still be applicable or relevant despite changes to communications conditions that may have changed. For example, a UE may still receive or transmit power control information (PCI). PCI may not expire as quickly as other indications because it may not depend on or be as related to instantaneous CSI (or may depend on instantaneous CSI to a lesser degree).

In some examples, the cancellation or expiration of a CSI report may be based on a change or transition between QCL indications or TCI states, among other factors. For example, a transition from TCI state "X" to TCI state "Y" (e.g., where such transition occurs at a time represented by the first QCL change in FIG. 3) may cancel a CSI report (e.g., the first CSI report 320). However, not every change in TCI or QCL will lead to cancelling or expiring a CSI report. For example, a transition from TCI state "Z" to TCI state "Y" may not trigger a cancellation or expiration of a CSI reports. Such an approach may include cancellation of one or more entire CSI reports or information associated with or contained in one or more CSI reports, and different portions of such CSI reports may be transmitted based on such a QCL or TCI state transition. For example, if a transition is performed from TCI state "X" to TCI state "Z", a UE may transmit or receive PCI, channel quality information (CQI), or both, while a transition is performed from TCI state "Y" to TCI state "W", the UE may transmit or receive PCI and not transmit or receive CQI.

In some examples, a wireless device that may transmit one or more CSI reports may determine a set of potential CSI reports that may be transmitted, from which the wireless device may select one or more CSI reports to be cancelled. For example, a first UE may determine a selection of one or more CSI reports from a set of CSI reports for cancellation and may transmit one or more remaining CSI reports to a second UE. In some examples, a wireless device may determine which CSI reports to transmit or cancel based on a QCL or TCI (e.g., as described throughout this disclosure).

In some examples, a wireless device may determine feedback resources (e.g., PSFCH resources) based on one or more factors, such as a slot index, a PSSCH subchannel (such as a PSSCH resource start sub-channel or number of sub-channels that may be based on a flag or indication), a source identifier, a destination identifier, or any combination thereof. In some examples, one or more CSI reports may be transmitted over the same single or multiple feedback resources, and the same PSSCH slot index or sub-channel may be used. In some examples, a wireless device may overwrite a previous CSI report with a newer CSI report (e.g., after applying one or more determinations or procedures for cancellation as described herein), and, in some cases, both the previous CSI report and the newer CSI report may be received during a time duration that may fall between feedback resources.

Figure 4A:
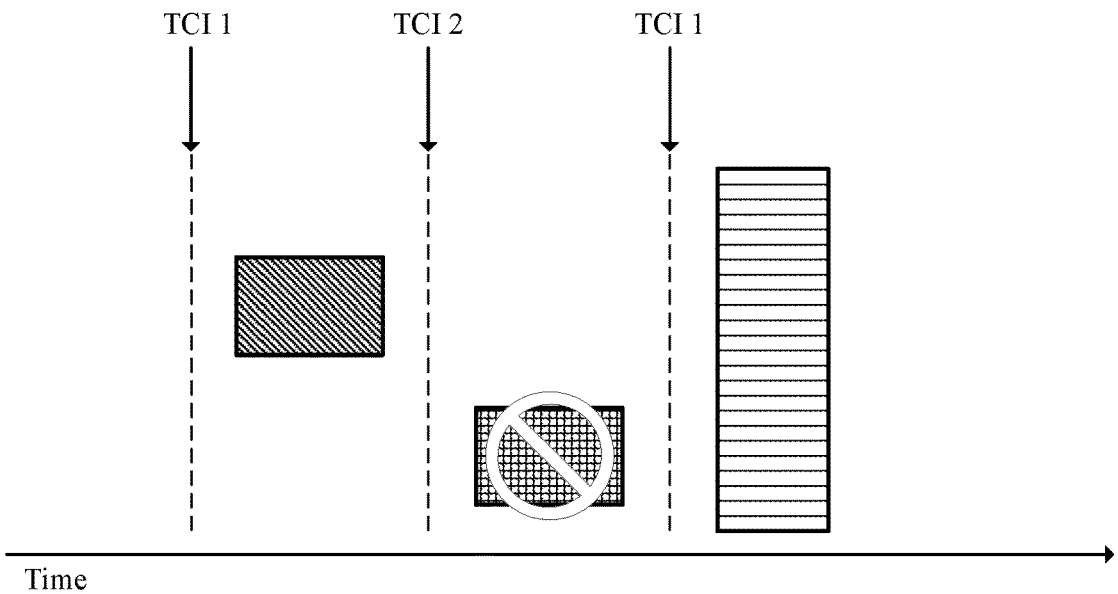
FIGS. 4A and 4B illustrate examples of a CSI report cancellation scheme that supports channel state information report cancellation in accordance with aspects of the present disclosure.

FIG. 4A illustrates an example of a CSI report cancellation scheme 400 that supports channel state information report cancellation in accordance with aspects of the present disclosure. In the CSI report cancellation scheme 400, a UE may receive a first CSI report 420, a second CSI report 425, or both, and the UE may transmit a PSFCH transmission 430 that may report feedback associated with one or more of the first CSI report 420 or the second CSI report 425. In some examples, the first CSI report 420 and the second CSI report 425 may be associated with one or more transmissions from a transmitting UE, for example, to the receiving UE. In some examples, the first CSI report 420 may have been computed, selected, or otherwise obtained based on TCI 1. Further, the second CSI report 425 may have been computed, selected, or otherwise obtained based on TCI 2.

In some examples, one or more CSI reports may be canceled based on receiving a QCL indication change or a TCI state change. In the example of FIG. 4A, a UE has received a series of TCI state changes (e.g., state 1, state 2, and state 1 again). Here, TCI 1 may be the most-recently received TCI state. As a result, the first CSI report 420 (that was based on TCI 1) may still be valid or applicable, even though the second CSI report 425 is a more-recently received CSI report (or in some examples a most-recently received CSI report). As such, the UE may cancel the second CSI report 425 in favor of the first CSI report 420, since the first CSI report may be more applicable or relevant to the most recently received QCL indication or TCI state.

Figure 4B:
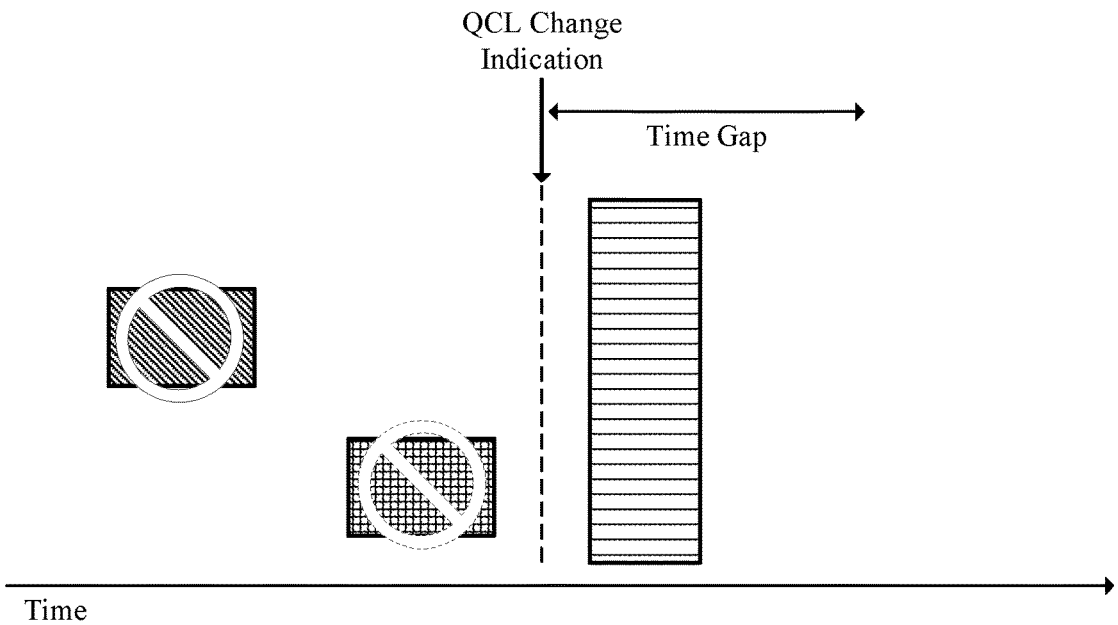

FIG. 4B illustrates an example of a CSI report cancellation scheme 400 that supports channel state information report cancellation in accordance with aspects of the present disclosure. In the CSI report cancellation scheme 450, a UE may receive a first CSI report 420, a second CSI report 425, or both, and the UE may transmit a PSFCH transmission 430 that may report feedback associated with one or more of the first CSI report 420 or the second CSI report 425. In some examples, the first CSI report 420 and the second CSI report 425 may be associated with one or more transmissions from a transmitting UE to the receiving UE.

In the scenario depicted in FIG. 4B, a UE may schedule a feedback message (e.g., the PSFCH transmission) to be transmitted to another device (e.g., over a PSFCH). Further, the UE may receive control information that may schedule transmission of an additional CSI report. In some examples, this CSI report may be scheduled for a time after the transmission of the feedback message. The UE may cancel one or more earlier received CSI reports (e.g., the first CSI report 420, the second CSI report 425, or both). The UE may cancel such a report because, due to a time gap (e.g., an enforced time gap), the UE may determine that the earlier received CSI report may no longer be valid or applicable to communication conditions (e.g., more particularly, that the earlier received CSI report may no longer be valid or applicable to a transmission associated with the scheduled third CSI report) at a time after the expiration of the time gap.

In some examples, the UE may transmit the PSFCH transmission 430 in a first slot that may include PSFCH resources. The PSFCH transmission 430 may occur at least a number of slots after a last slot of a reception of a PSSCH message. In some examples, a QCL indication (e.g., the QCL change indication depicted in FIG. 4B) may be received over SCI, and the SCI may schedule a PSSCH transmission, and the PSSCH transmission may be associated with another CSI report (e.g., a third CSI report). In some examples, the UE may receive this CSI after transmitting the PSFCH transmission 430. As such, the first CSI report 420 may be canceled, as the first CSI report 420 may be associated with an outdated or irrelevant QCL or TCI state. Further, the UE may determine that, because the schedule PSSCH transmission (and associated CSI report) are to be transmitted after the PSFCH transmission 430, the first CSI report 420 may be irrelevant or outdated due to the time difference between the reception of the first CSI report 420 and the scheduled time of the upcoming PSSCH transmission (and the associated CSI report). In some examples, the UE may further determine that the second CSI report 425 may also be outdated for similar reasons. The UE may also cancel the second CSI report 425 in some examples.

Figure 5:
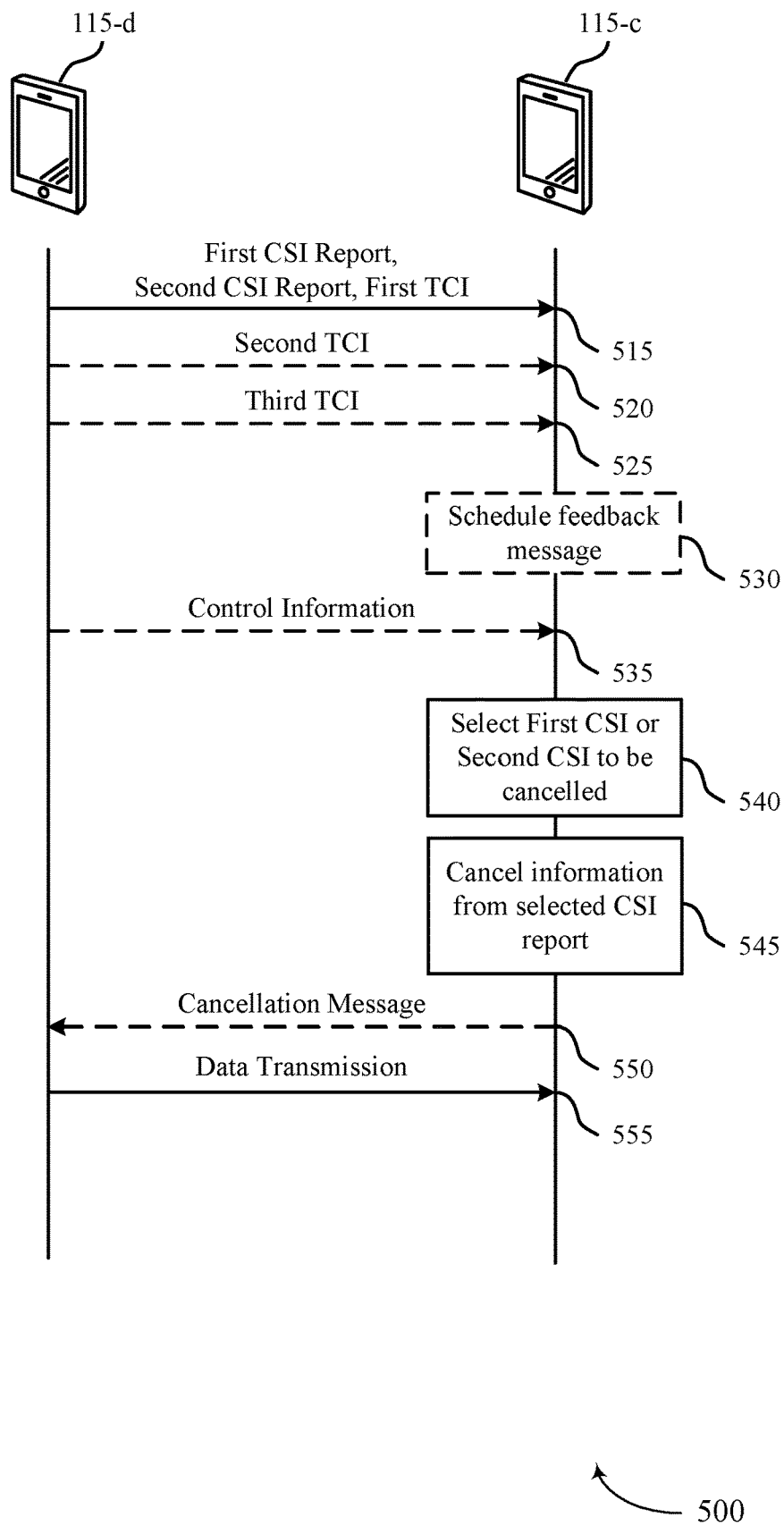
FIG. 5 illustrates an example of a process flow that supports CSI report cancellation in accordance with aspects of the present disclosure.

FIG. 5 illustrates an example of a process flow 500 that supports channel state information report cancellation in accordance with aspects of the present disclosure. The process flow 500 may implement various aspects of the present disclosure described with reference to FIGS. 1-4. The process flow 500 may include a UE 115-c and a UE 115-d, which may be examples of UE 115 as described with reference to FIGS. 1-7. In some examples, the UE 115-c may be configured with a one or more parameters for CSI report cancellation.

In the following description of the process flow 500, the operations between the UE 115-c and the UE 115-d may be performed in different orders or at different times. Some operations may also be left out of the process flow 500, or other operations may be added. Although the UE 115-c and the UE 115-d are shown performing the operations of the process flow 500, some aspects of some operations may also be performed by a base station, the UE 115-c, the UE 115-d, one or more other wireless devices, or any combination thereof.

At 515, the UE 115-c may receive, for example from a second UE (e.g., the UE 115-d) over a sidelink channel, a first channel state information report, a second channel state information report, and a first transmission configuration indicator. In some examples, the UE 115-c may receive power control information associated with at least one of the first channel state information report or the second channel state information report.

At 520, the UE 115-c may receive, from the second UE, a second transmission configuration indicator associated with the second channel state information report. In some examples, the first transmission configuration indicator may be associated with a first transmission configuration indicator state, and the UE 115-c may receive a second transmission configuration indicator associated with a second transmission configuration indicator state.

At 525, the UE 115-c may receive a third transmission configuration indicator that may include information included in the first transmission configuration indicator.

At 530, the UE 115-c may schedule transmission of a feedback message to be transmitted after receiving the first channel state information report and the second channel state information report.

At 535, the UE 115-c may receive control information scheduling transmission of a third channel state information report to be received by the UE after the transmission of the feedback message.

At 540, the UE 115-c may select at least one of the first channel state information report or the second channel state information report to be canceled based on receiving an indication associated with the first transmission configuration indicator. In some examples, the second channel state information report may be associated with a channel state that may be more recent than a channel state associated with the first channel state information report. In some examples, the first channel state information report and the second channel state information report may be received within a duration of the first transmission configuration indicator. In some examples, the indication may include or may be a most-recently received indication. In some examples, the indication may include or may be a sidelink data transmission. In some examples, the indication may include or may be a sidelink feedback transmission. In some examples, the indication may include a cancellation message that indicates that at least one of the first channel state information report or the second channel state information report is canceled.

At 545, the UE 115-c may cancel information included in at least one of the first channel state information report or the second channel state information report based on the selecting. In some examples, the UE 115-c may cancel the first channel state information report, and the indication may include the second channel state information report. In some examples, the UE 115-c may cancel the second channel state information report, the first channel state information report may be associated with the first transmission configuration indicator, and the indication may include the third transmission configuration indicator. In some examples, the UE 115-c may cancel the first channel state information report and the second channel state information report based on receiving the control information. In some examples, the UE 115-c may cancel one or more portions of at least one of the first channel state information report or the second channel state information report based on the first transmission configuration indicator state and the second transmission configuration indicator state. In some examples, cancelling the information may be based on the cancellation message.

In some examples, as described herein, the UE 115-c may the use the non-cancelled CSI report for communication with another wireless device (e.g., the UE 115-d). Additionally or alternatively, the UE 115-c may transmit some or all of the non-cancelled CSI report information to another wireless device (e.g., a base station, another UE, one or more other wireless devices, or any combination thereof). In this way, the CSI information may be transmitted to one or more devices that may engage in communications with the UE 115-d.

At 550, the UE 115-c may transmit, to the second UE (e.g., UE 115-d), a cancellation message that indicates that at least one of the first channel state information report or the second channel state information report is canceled.

At 555, the UE 115-c may receive a data transmission based on the cancelling. In some examples, receiving the data transmission may be based on receiving the power control information.

Figure 6:
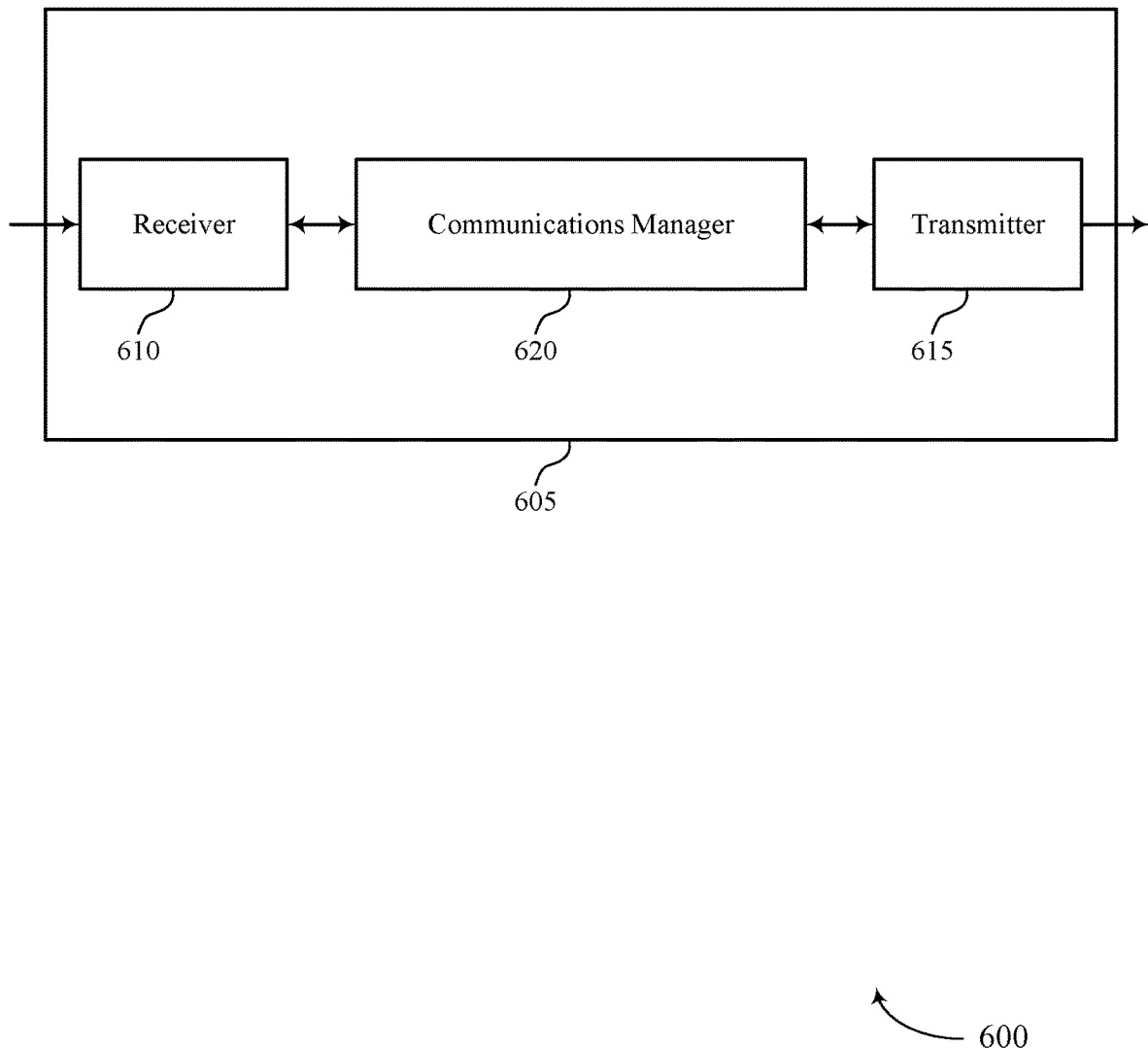
FIGS. 6 and 7 show block diagrams of devices that support CSI report cancellation in accordance with aspects of the present disclosure.

FIG. 6 shows a block diagram 600 of a device 605 that supports channel state information report cancellation in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel state information report cancellation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel state information report cancellation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of channel state information report cancellation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for receiving, from second UE over a sidelink channel, a first channel state information report, a second channel state information report, and a first transmission configuration indicator. The communications manager 620 may be configured as or otherwise support a means for selecting at least one of the first channel state information report or the second channel state information report to be canceled based on receiving an indication associated with the first transmission configuration indicator. The communications manager 620 may be configured as or otherwise support a means for cancelling information included in at least one of the first channel state information report or the second channel state information report based on the selecting. The communications manager 620 may be configured as or otherwise support a means for receiving a data transmission based on the cancelling.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, more efficient utilization of communication resources, or a combination thereof.

Figure 7:
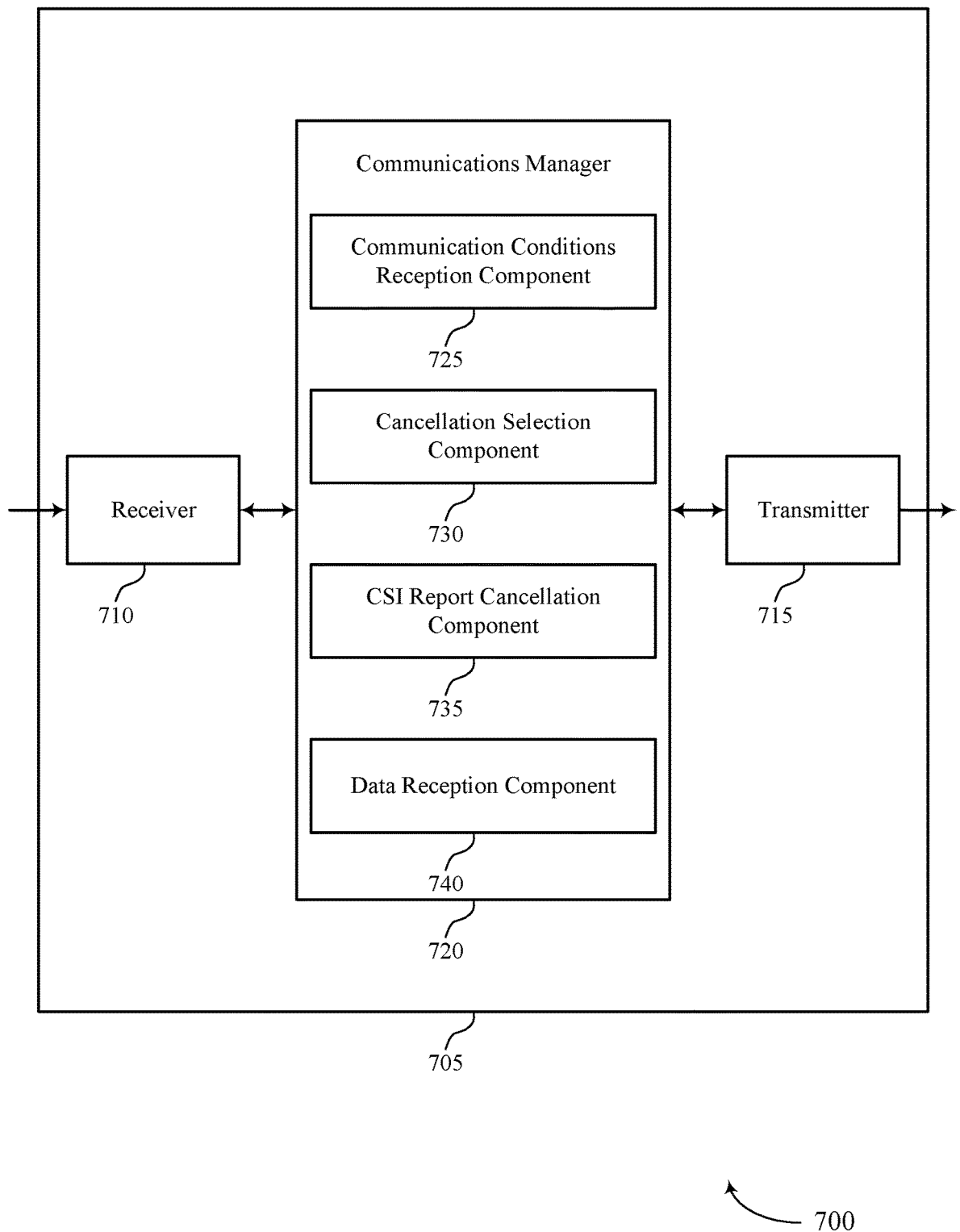

FIG. 7 shows a block diagram 700 of a device 705 that supports channel state information report cancellation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel state information report cancellation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel state information report cancellation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of channel state information report cancellation as described herein. For example, the communications manager 720 may include a communication conditions reception component 725, a cancellation selection component 730, a CSI report cancellation component 735, a data reception component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The communication conditions reception component 725 may be configured as or otherwise support a means for receiving, from second UE over a sidelink channel, a first channel state information report, a second channel state information report, and a first transmission configuration indicator. The cancellation selection component 730 may be configured as or otherwise support a means for selecting at least one of the first channel state information report or the second channel state information report to be canceled based on receiving an indication associated with the first transmission configuration indicator. The CSI report cancellation component 735 may be configured as or otherwise support a means for cancelling information included in at least one of the first channel state information report or the second channel state information report based on the selecting. The data reception component 740 may be configured as or otherwise support a means for receiving a data transmission based on the cancelling.

Figure 8:
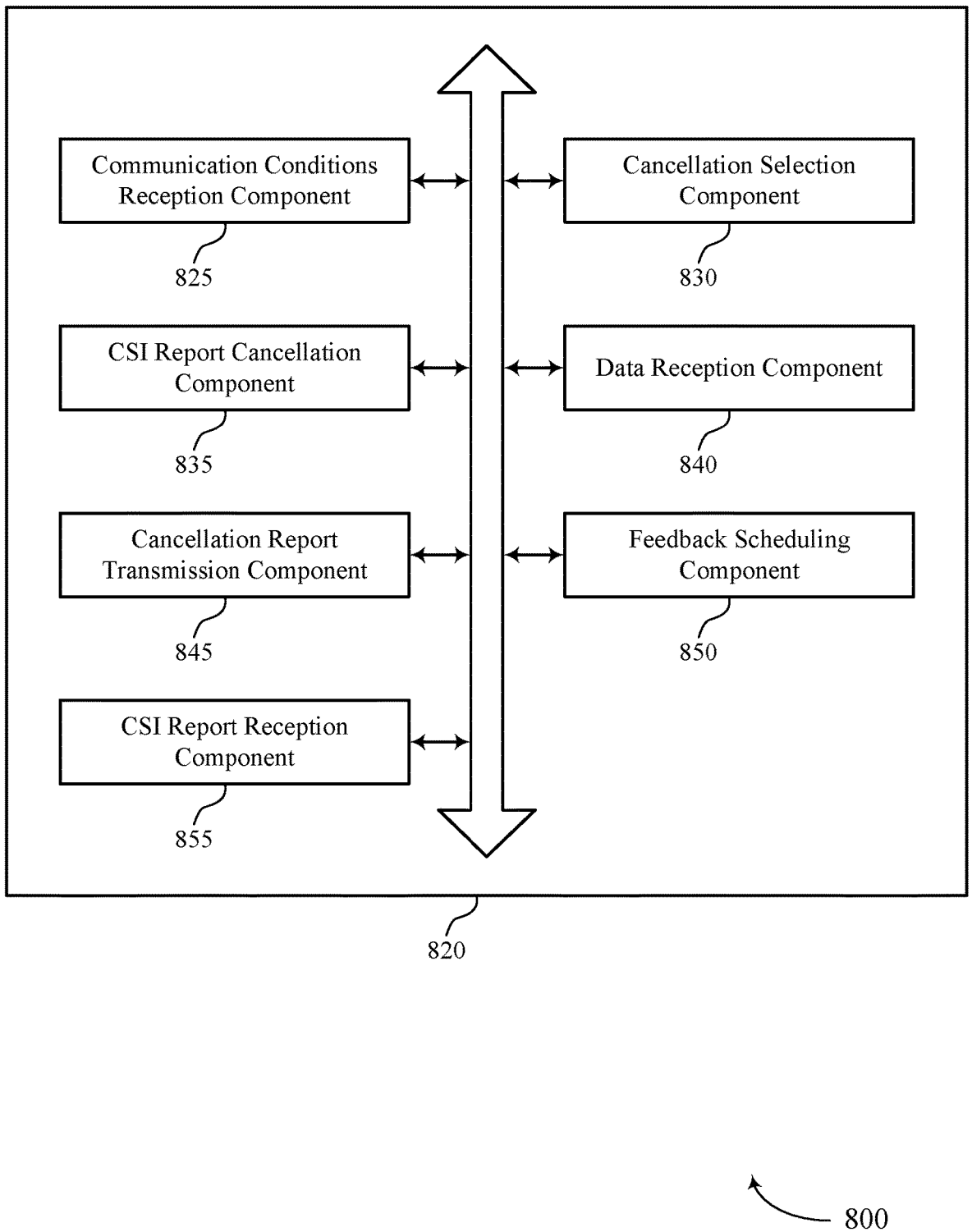
FIG. 8 shows a block diagram of a communications manager that supports CSI report cancellation in accordance with aspects of the present disclosure.

FIG. 8 shows a block diagram 800 of a communications manager 820 that supports channel state information report cancellation in accordance with aspects of the present disclosure. The communications manager 820 may be an example of aspects of a communications manager 620, a communications manager 720, or both, as described herein. The communications manager 820, or various components thereof, may be an example of means for performing various aspects of channel state information report cancellation as described herein. For example, the communications manager 820 may include a communication conditions reception component 825, a cancellation selection component 830, a CSI report cancellation component 835, a data reception component 840, a cancellation report transmission component 845, a feedback scheduling component 850, a CSI report reception component 855, or any combination thereof. Each of these components may communicate, directly or indirectly, with one another (e.g., via one or more buses).

The communications manager 820 may support wireless communications at a first UE in accordance with examples as disclosed herein. The communication conditions reception component 825 may be configured as or otherwise support a means for receiving, from second UE over a sidelink channel, a first channel state information report, a second channel state information report, and a first transmission configuration indicator. The cancellation selection component 830 may be configured as or otherwise support a means for selecting at least one of the first channel state information report or the second channel state information report to be canceled based on receiving an indication associated with the first transmission configuration indicator. The CSI report cancellation component 835 may be configured as or otherwise support a means for cancelling information included in at least one of the first channel state information report or the second channel state information report based on the selecting. The data reception component 840 may be configured as or otherwise support a means for receiving a data transmission based on the cancelling.

In some examples, the cancellation report transmission component 845 may be configured as or otherwise support a means for transmitting, to the second UE, a cancellation message that indicates that at least one of the first channel state information report or the second channel state information report is canceled.

In some examples, to support cancelling at least one of the first channel state information report or the second channel state information report, the CSI report cancellation component 835 may be configured as or otherwise support a means for cancelling the first channel state information report, where the indication includes the second channel state information report.

In some examples, the second channel state information report is associated with a channel state that is more recent than a channel state associated with the first channel state information report.

In some examples, the first channel state information report and the second channel state information report are received within a duration of the first transmission configuration indicator.

In some examples, the communication conditions reception component 825 may be configured as or otherwise support a means for receiving, from the second UE, a second transmission configuration indicator associated with the second channel state information report and a third transmission configuration indicator including information included in the first transmission configuration indicator. In some examples, the CSI report cancellation component 835 may be configured as or otherwise support a means for cancelling the second channel state information report, where the first channel state information report is associated with the first transmission configuration indicator and the indication includes the third transmission configuration indicator.

In some examples, the feedback scheduling component 850 may be configured as or otherwise support a means for scheduling transmission of a feedback message to be transmitted after receiving the first channel state information report and the second channel state information report. In some examples, the communication conditions reception component 825 may be configured as or otherwise support a means for receiving control information scheduling transmission of a third channel state information report to be received by the UE after the transmission of the feedback message. In some examples, the CSI report cancellation component 835 may be configured as or otherwise support a means for cancelling the first channel state information report and the second channel state information report based on receiving the control information.

In some examples, the indication includes a most-recently received indication.

In some examples, the communication conditions reception component 825 may be configured as or otherwise support a means for receiving power control information associated with at least one of the first channel state information report or the second channel state information report, where receiving the data transmission is based on receiving the power control information.

In some examples, the first transmission configuration indicator is associated with a first transmission configuration indicator state, and the communication conditions reception component 825 may be configured as or otherwise support a means for receiving a second transmission configuration indicator associated with a second transmission configuration indicator state. In some examples, the first transmission configuration indicator is associated with a first transmission configuration indicator state, and the CSI report cancellation component 835 may be configured as or otherwise support a means for where cancelling at least one of the first channel state information report or the second channel state information report includes cancelling one or more portions of at least one of the first channel state information report or the second channel state information report based on the first transmission configuration indicator state and the second transmission configuration indicator state.

In some examples, the indication includes a sidelink data transmission.

In some examples, the indication includes a sidelink feedback transmission.

In some examples, the indication includes a cancellation message that indicates that at least one of the first channel state information report or the second channel state information report is canceled. In some examples, cancelling the information is based on the cancellation message.

Figure 9:
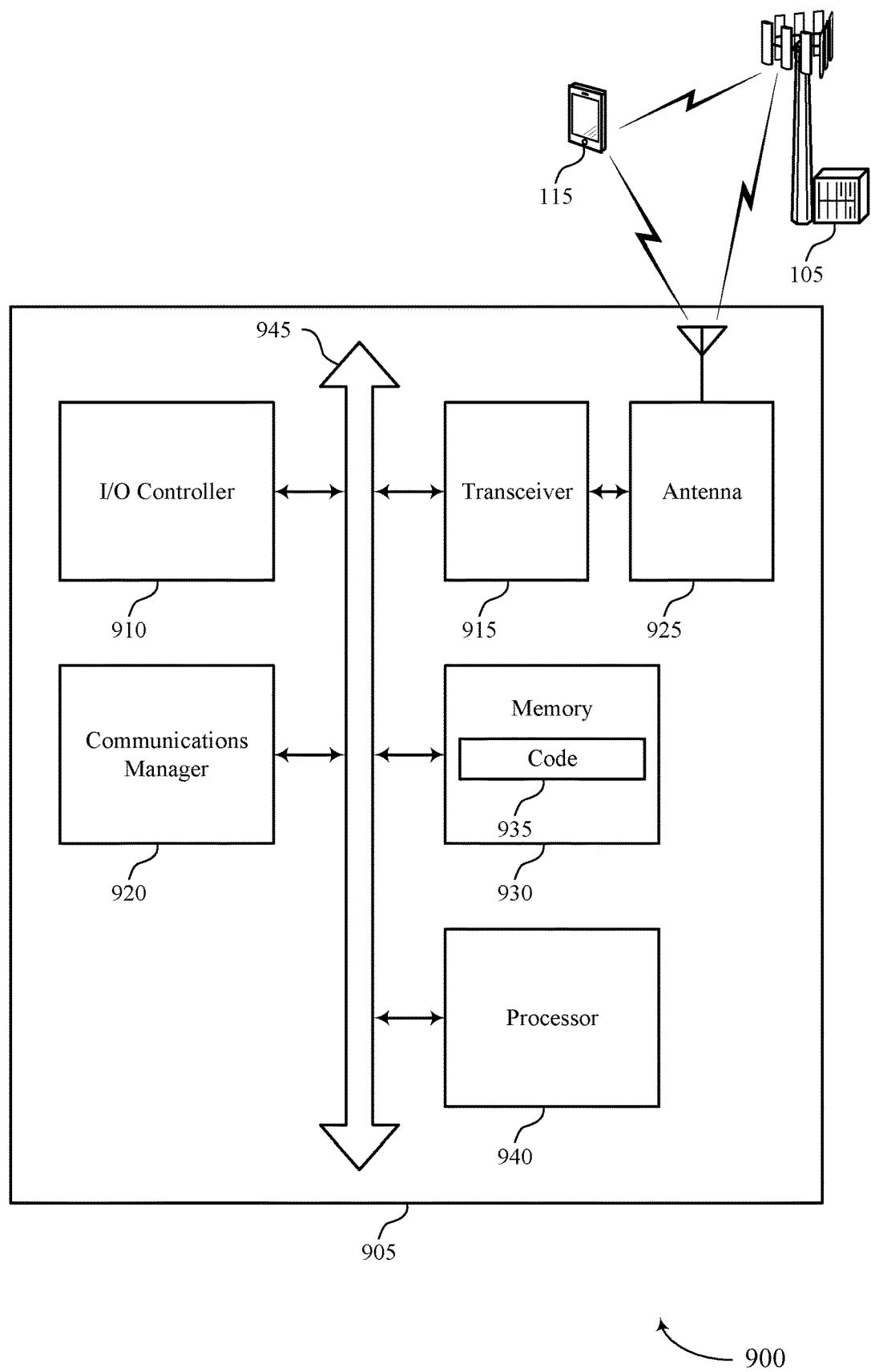
FIG. 9 shows a diagram of a system including a device that supports CSI report cancellation in accordance with aspects of the present disclosure.

FIG. 9 shows a diagram of a system 900 including a device 905 that supports channel state information report cancellation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting channel state information report cancellation). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for receiving, from second UE over a sidelink channel, a first channel state information report, a second channel state information report, and a first transmission configuration indicator. The communications manager 920 may be configured as or otherwise support a means for selecting at least one of the first channel state information report or the second channel state information report to be canceled based on receiving an indication associated with the first transmission configuration indicator. The communications manager 920 may be configured as or otherwise support a means for cancelling information included in at least one of the first channel state information report or the second channel state information report based on the selecting. The communications manager 920 may be configured as or otherwise support a means for receiving a data transmission based on the cancelling.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of channel state information report cancellation as described herein, or the processor 940 and the memory 930 may be otherwise configured to perform or support such operations.

Figure 10:
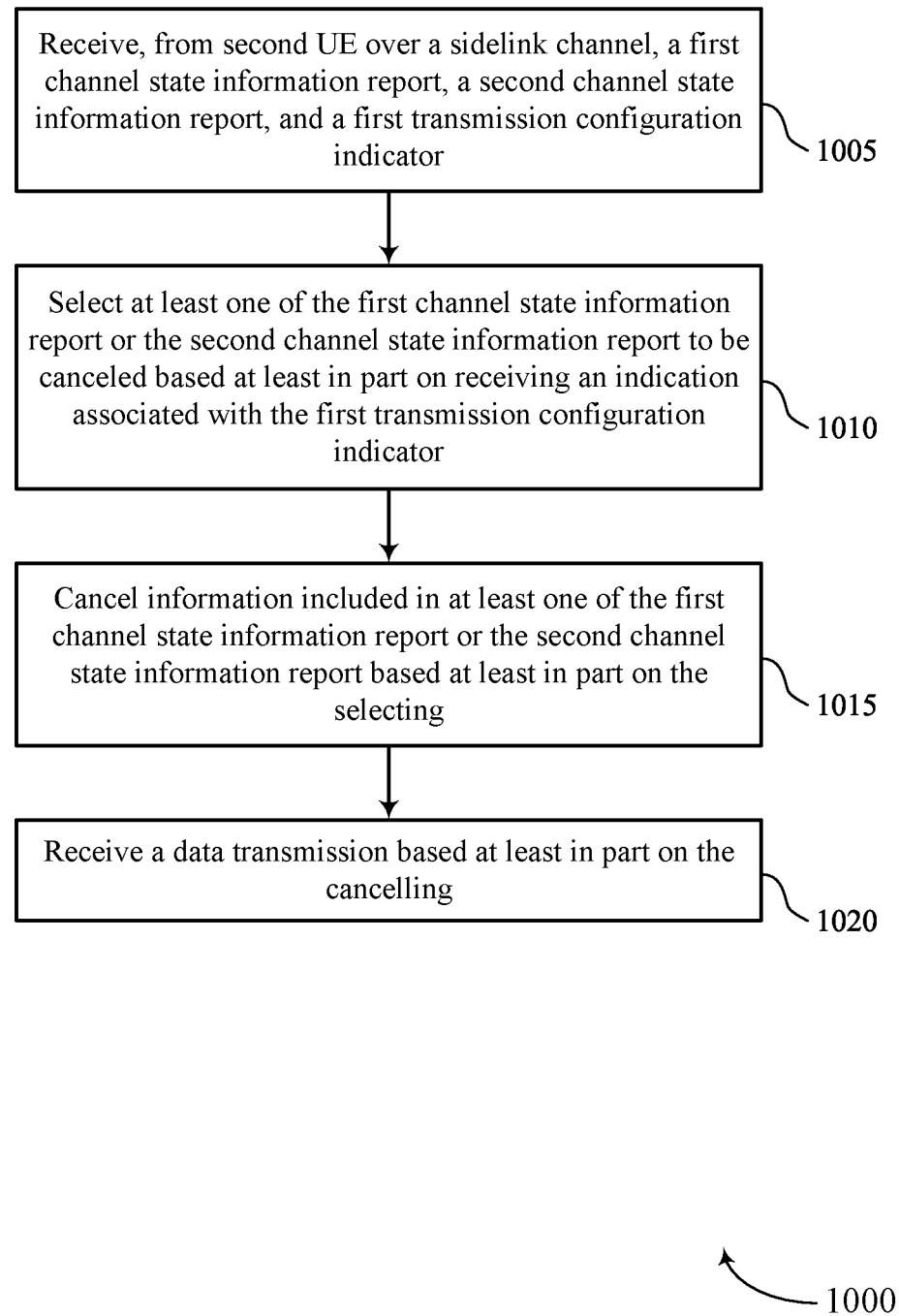
FIGS. 10 through 13 show flowcharts illustrating methods that support CSI report cancellation in accordance with aspects of the present disclosure.

FIG. 10 shows a flowchart illustrating a method 1000 that supports channel state information report cancellation in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from second UE over a sidelink channel, a first channel state information report, a second channel state information report, and a first transmission configuration indicator. The operations of 1005 may be performed in accordance with examples as disclosed herein. In some examples, aspects of the operations of 1005 may be performed by a communication conditions reception component 825 as described with reference to FIG. 8.

At 1010, the method may include selecting at least one of the first channel state information report or the second channel state information report to be canceled based on receiving an indication associated with the first transmission configuration indicator. The operations of 1010 may be performed in accordance with examples as disclosed herein. In some examples, aspects of the operations of 1010 may be performed by a cancellation selection component 830 as described with reference to FIG. 8.

At 1015, the method may include cancelling information included in at least one of the first channel state information report or the second channel state information report based on the selecting. The operations of 1015 may be performed in accordance with examples as disclosed herein. In some examples, aspects of the operations of 1015 may be performed by a CSI report cancellation component 835 as described with reference to FIG. 8.

At 1020, the method may include receiving a data transmission based on the cancelling. The operations of 1020 may be performed in accordance with examples as disclosed herein. In some examples, aspects of the operations of 1020 may be performed by a data reception component 840 as described with reference to FIG. 8.

Figure 11:
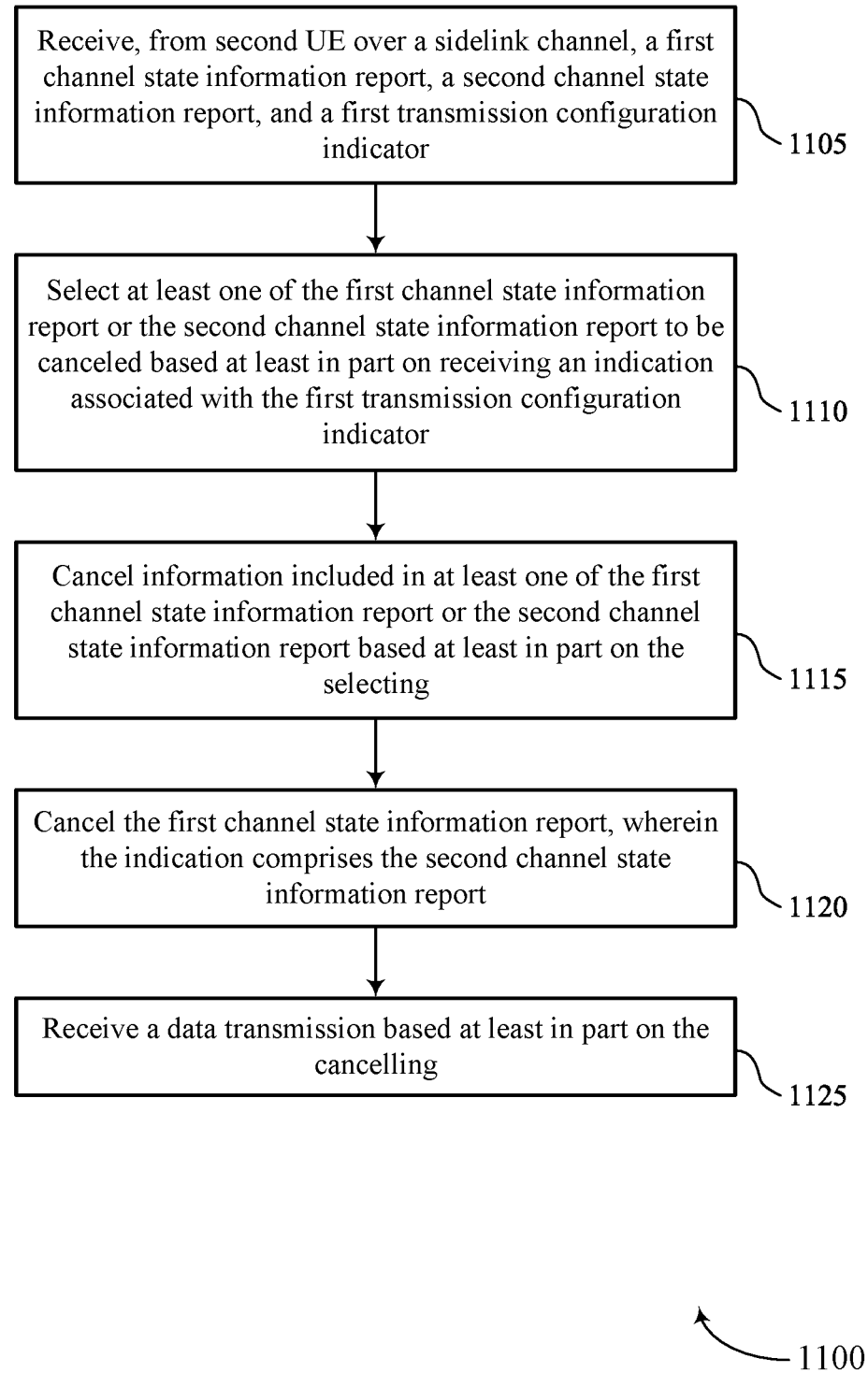

FIG. 11 shows a flowchart illustrating a method 1100 that supports channel state information report cancellation in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from second UE over a sidelink channel, a first channel state information report, a second channel state information report, and a first transmission configuration indicator. The operations of 1105 may be performed in accordance with examples as disclosed herein. In some examples, aspects of the operations of 1105 may be performed by a communication conditions reception component 825 as described with reference to FIG. 8.

At 1110, the method may include selecting at least one of the first channel state information report or the second channel state information report to be canceled based on receiving an indication associated with the first transmission configuration indicator. The operations of 1110 may be performed in accordance with examples as disclosed herein. In some examples, aspects of the operations of 1110 may be performed by a cancellation selection component 830 as described with reference to FIG. 8.

At 1115, the method may include cancelling information included in at least one of the first channel state information report or the second channel state information report based on the selecting. The operations of 1115 may be performed in accordance with examples as disclosed herein. In some examples, aspects of the operations of 1115 may be performed by a CSI report cancellation component 835 as described with reference to FIG. 8.

At 1120, the method may include cancelling the first channel state information report, where the indication includes the second channel state information report. The operations of 1120 may be performed in accordance with examples as disclosed herein. In some examples, aspects of the operations of 1120 may be performed by a CSI report cancellation component 835 as described with reference to FIG. 8.

At 1125, the method may include receiving a data transmission based on the cancelling. The operations of 1125 may be performed in accordance with examples as disclosed herein. In some examples, aspects of the operations of 1125 may be performed by a data reception component 840 as described with reference to FIG. 8.

Figure 12:
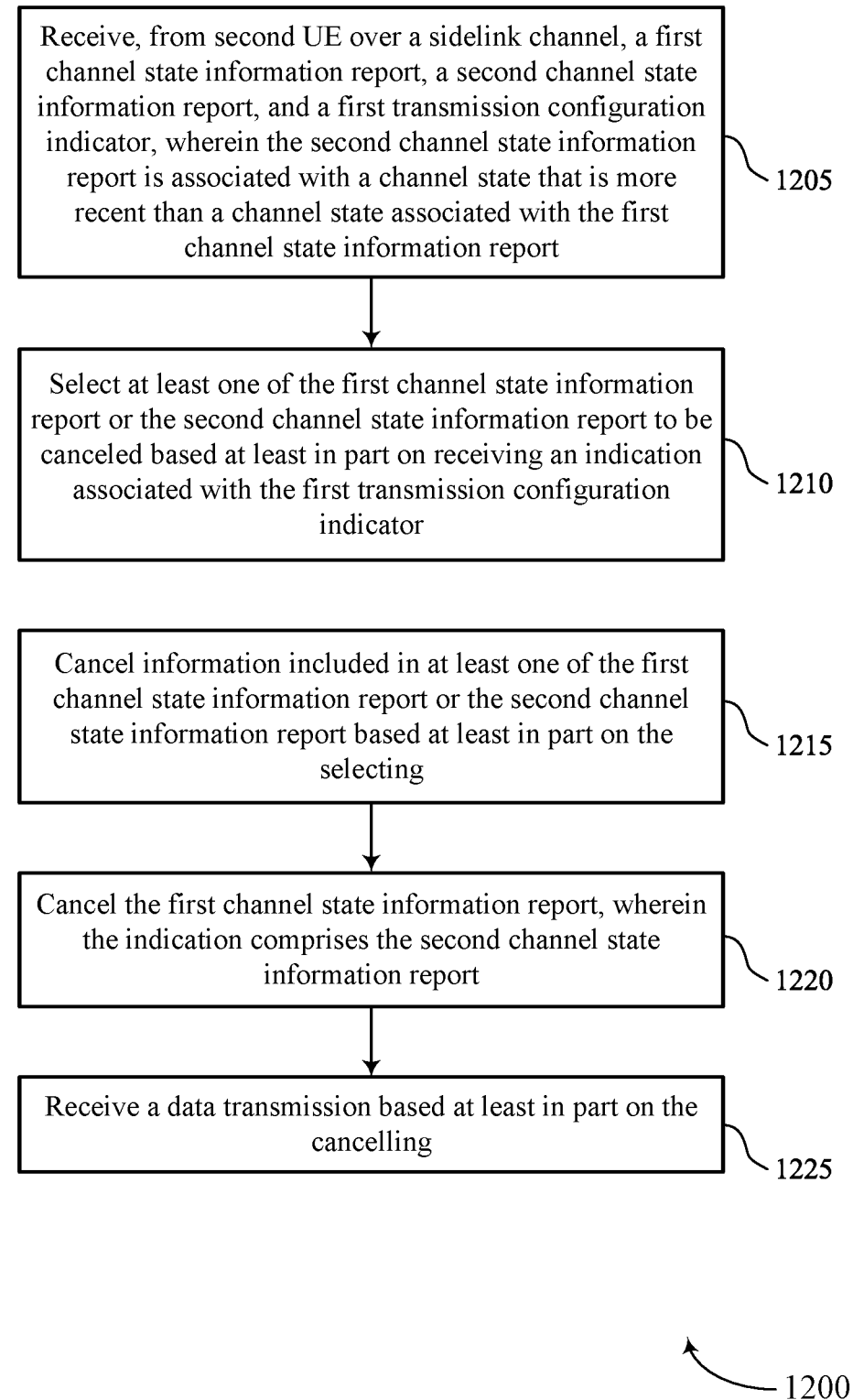

FIG. 12 shows a flowchart illustrating a method 1200 that supports channel state information report cancellation in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from second UE over a sidelink channel, a first channel state information report, a second channel state information report, and a first transmission configuration indicator. The operations of 1205 may be performed in accordance with examples as disclosed herein. In some examples, aspects of the operations of 1205 may be performed by a communication conditions reception component 825 as described with reference to FIG. 8. The method may include the second channel state information report being associated with a channel state that is more recent than a channel state associated with the first channel state information report. The operations of 1205 may be performed in accordance with examples as disclosed herein. In some examples, aspects of the operations of 1205 may be performed by a communication conditions reception component 825 as described with reference to FIG. 8.

At 1210, the method may include selecting at least one of the first channel state information report or the second channel state information report to be canceled based on receiving an indication associated with the first transmission configuration indicator. The operations of 1210 may be performed in accordance with examples as disclosed herein. In some examples, aspects of the operations of 1210 may be performed by a cancellation selection component 830 as described with reference to FIG. 8.

At 1215, the method may include cancelling information included in at least one of the first channel state information report or the second channel state information report based on the selecting. The operations of 1215 may be performed in accordance with examples as disclosed herein. In some examples, aspects of the operations of 1215 may be performed by a CSI report cancellation component 835 as described with reference to FIG. 8.

At 1220, the method may include cancelling the first channel state information report, where the indication includes the second channel state information report. The operations of 1220 may be performed in accordance with examples as disclosed herein. In some examples, aspects of the operations of 1220 may be performed by a CSI report cancellation component 835 as described with reference to FIG. 8.

At 1225, the method may include receiving a data transmission based on the cancelling. The operations of 1225 may be performed in accordance with examples as disclosed herein. In some examples, aspects of the operations of 1225 may be performed by a data reception component 840 as described with reference to FIG. 8.

Figure 13:
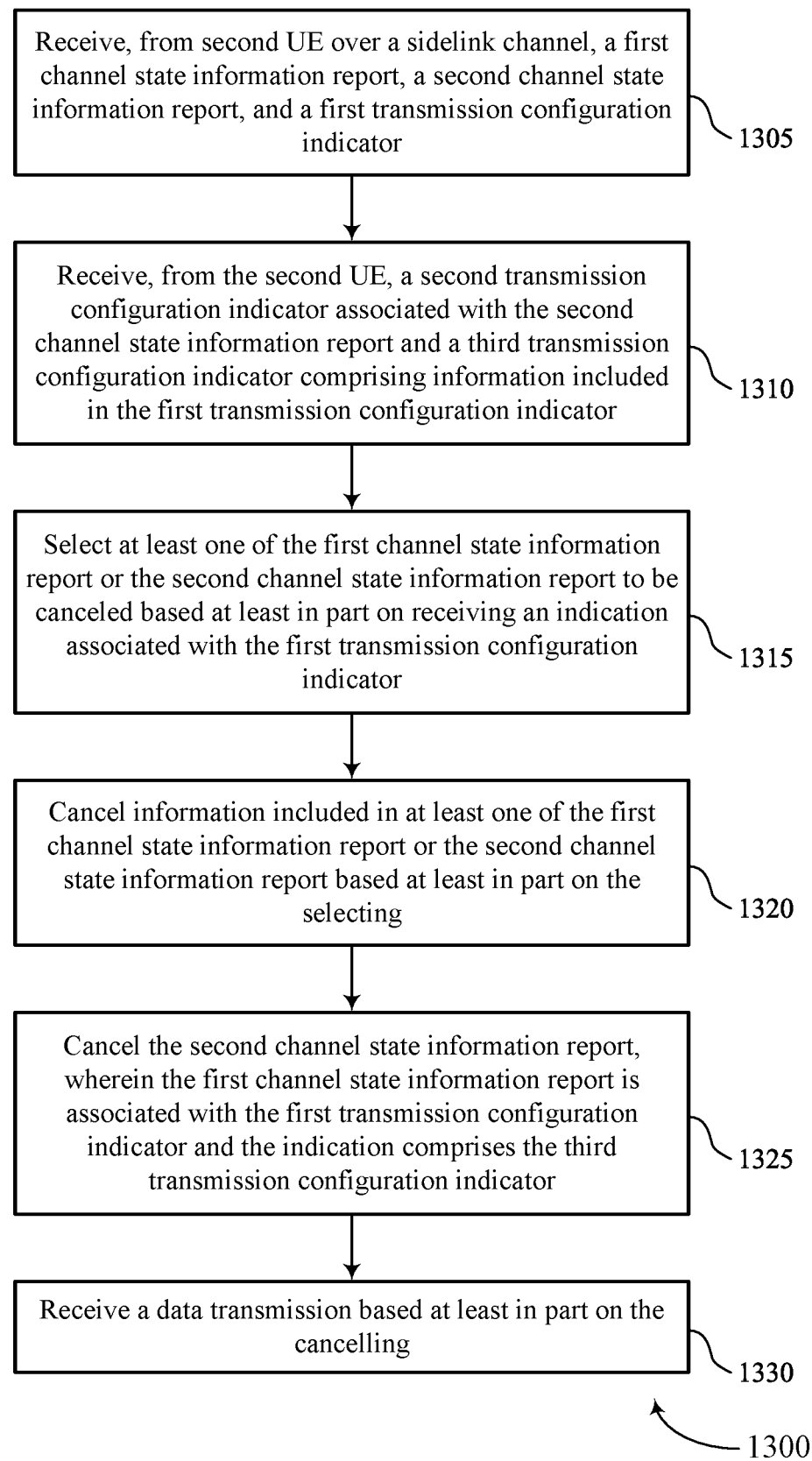

FIG. 13 shows a flowchart illustrating a method 1300 that supports channel state information report cancellation in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, from second UE over a sidelink channel, a first channel state information report, a second channel state information report, and a first transmission configuration indicator. The operations of 1305 may be performed in accordance with examples as disclosed herein. In some examples, aspects of the operations of 1305 may be performed by a communication conditions reception component 825 as described with reference to FIG. 8.

At 1310, the method may include receiving, from the second UE, a second transmission configuration indicator associated with the second channel state information report and a third transmission configuration indicator including information included in the first transmission configuration indicator. The operations of 1310 may be performed in accordance with examples as disclosed herein. In some examples, aspects of the operations of 1310 may be performed by a communication conditions reception component 825 as described with reference to FIG. 8.

At 1315, the method may include selecting at least one of the first channel state information report or the second channel state information report to be canceled based on receiving an indication associated with the first transmission configuration indicator. The operations of 1315 may be performed in accordance with examples as disclosed herein. In some examples, aspects of the operations of 1315 may be performed by a cancellation selection component 830 as described with reference to FIG. 8.

At 1320, the method may include cancelling information included in at least one of the first channel state information report or the second channel state information report based on the selecting. The operations of 1320 may be performed in accordance with examples as disclosed herein. In some examples, aspects of the operations of 1320 may be performed by a CSI report cancellation component 835 as described with reference to FIG. 8.

At 1325, the method may include cancelling the second channel state information report, where the first channel state information report is associated with the first transmission configuration indicator and the indication includes the third transmission configuration indicator. The operations of 1325 may be performed in accordance with examples as disclosed herein. In some examples, aspects of the operations of 1325 may be performed by a CSI report cancellation component 835 as described with reference to FIG. 8.

At 1330, the method may include receiving a data transmission based on the cancelling. The operations of 1330 may be performed in accordance with examples as disclosed herein. In some examples, aspects of the operations of 1330 may be performed by a data reception component 840 as described with reference to FIG. 8.

The following provides an overview of aspects of the present disclosure:

Aspect 1: A method for wireless communications at a first UE, comprising: receiving, from second UE over a sidelink channel, a first channel state information report, a second channel state information report, and a first transmission configuration indicator; selecting at least one of the first channel state information report or the second channel state information report to be canceled based at least in part on receiving an indication associated with the first transmission configuration indicator; cancelling information included in at least one of the first channel state information report or the second channel state information report based at least in part on the selecting; and receiving a data transmission based at least in part on the cancelling.

Aspect 2: The method of aspect 1, further comprising: transmitting, to the second UE, a cancellation message that indicates that at least one of the first channel state information report or the second channel state information report is canceled.

Aspect 3: The method of any of aspects 1 through 2, wherein cancelling at least one of the first channel state information report or the second channel state information report comprises: cancelling the first channel state information report, wherein the indication comprises the second channel state information report.

Aspect 4: The method of aspect 3, wherein the second channel state information report is associated with a channel state that is more recent than a channel state associated with the first channel state information report.

Aspect 5: The method of any of aspects 3 through 4, wherein the first channel state information report and the second channel state information report are received within a duration of the first transmission configuration indicator.

Aspect 6: The method of any of aspects 1 through 5, further comprising: receiving, from the second UE, a second transmission configuration indicator associated with the second channel state information report and a third transmission configuration indicator comprising information included in the first transmission configuration indicator; and cancelling the second channel state information report, wherein the first channel state information report is associated with the first transmission configuration indicator and the indication comprises the third transmission configuration indicator.

Aspect 7: The method of any of aspects 1 through 6, further comprising: scheduling transmission of a feedback message to be transmitted after receiving the first channel state information report and the second channel state information report; receiving control information scheduling transmission of a third channel state information report to be received by the UE after the transmission of the feedback message; and cancelling the first channel state information report and the second channel state information report based at least in part on receiving the control information.

Aspect 8: The method of any of aspects 1 through 7, wherein the indication comprises a most-recently received indication.

Aspect 9: The method of any of aspects 1 through 8, further comprising: receiving power control information associated with at least one of the first channel state information report or the second channel state information report, wherein receiving the data transmission is based at least in part on receiving the power control information.

Aspect 10: The method of any of aspects 1 through 9, wherein the first transmission indicator is associated with a first transmission configuration indicator state, the method further comprising: receiving a second transmission configuration indicator associated with a second transmission configuration indicator state; wherein cancelling at least one of the first channel state information report or the second channel state information report comprises cancelling one or more portions of at least one of the first channel state information report or the second channel state information report based at least in part on the first transmission configuration indicator state and the second transmission configuration indicator state.

Aspect 11: The method of any of aspects 1 through 10, wherein the indication comprises a sidelink data transmission.

Aspect 12: The method of any of aspects 1 through 11, wherein the indication comprises a sidelink feedback transmission.

Aspect 13: The method of any of aspects 1 through 12, wherein the indication comprises a cancellation message that indicates that at least one of the first channel state information report or the second channel state information is canceled; and cancelling the information is based at least in part on the cancellation message.

Aspect 14: An apparatus for wireless communications at a first UE, comprising a processor; memory coupled with the processor; and instructions stored in the memory and executable by the processor to cause the apparatus to perform a method of any of aspects 1 through 13.

Aspect 15: An apparatus for wireless communications at a first UE, comprising at least one means for performing a method of any of aspects 1 through 13.

Aspect 16: A non-transitory computer-readable medium storing code for wireless communications at a first UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:

receiving, from a second UE over a sidelink channel, a first channel state information report, a second channel state information report, and a first transmission configuration indicator;

selecting at least one of the first channel state information report or the second channel state information report to be canceled based at least in part on receiving an indication associated with the first transmission configuration indicator;

cancelling information included in at least one of the first channel state information report or the second channel state information report based at least in part on the selecting, wherein cancelling information included in at least one of the first channel state information report or the second channel state information report comprises:
    cancelling the first channel state information report when the indication comprises the second channel state information report; and
    receiving a data transmission based at least in part on the cancelling.

2. The method of claim 1, further comprising:
    transmitting, to the second UE, a cancellation message that indicates that at least one of the first channel state information report or the second channel state information report is canceled.

3. The method of claim 1, wherein the second channel state information report is associated with a channel state that is more recent than a channel state associated with the first channel state information report.

4. The method of claim 1, wherein the first channel state information report and the second channel state information report are received within a duration of the first transmission configuration indicator.

5. The method of claim 1, wherein the indication comprises a most-recently received indication.

6. The method of claim 1, further comprising:
    receiving power control information associated with at least one of the first channel state information report or the second channel state information report, wherein receiving the data transmission is based at least in part on receiving the power control information.

7. The method of claim 1, wherein the indication comprises a sidelink data transmission.

8. The method of claim 1, wherein the indication comprises a sidelink feedback transmission.

9. The method of claim 1, wherein:
    the indication comprises a cancellation message that indicates that at least one of the first channel state information report or the second channel state information report is canceled; and
    cancelling the information is based at least in part on the cancellation message.

10. A method for wireless communications at a first user equipment (UE), comprising:
    receiving, from a second UE over a sidelink channel, a first channel state information report, a second channel state information report, and a first transmission configuration indicator;
    selecting at least one of the first channel state information report or the second channel state information report to be canceled based at least in part on receiving an indication associated with the first transmission configuration indicator;
    cancelling information included in at least one of the first channel state information report or the second channel state information report based at least in part on the selecting;
    receiving a data transmission based at least in part on the cancelling;
    receiving, from the second UE, a second transmission configuration indicator associated with the second channel state information report and a third transmission configuration indicator comprising information included in the first transmission configuration indicator; and
    cancelling the second channel state information report, wherein the first channel state information report is associated with the first transmission configuration indicator and the indication comprises the third transmission configuration indicator.

11. The method of claim 1, further comprising: A method for wireless communications at a first user equipment (UE), comprising:
    receiving, from a second UE over a sidelink channel, a first channel state information report, a second channel state information report, and a first transmission configuration indicator;
    selecting at least one of the first channel state information report or the second channel state information report to be canceled based at least in part on receiving an indication associated with the first transmission configuration indicator;
    cancelling information included in at least one of the first channel state information report or the second channel state information report based at least in part on the selecting;
    receiving a data transmission based at least in part on the cancelling;
    scheduling transmission of a feedback message to be transmitted after receiving the first channel state information report and the second channel state information report;
    receiving control information scheduling transmission of a third channel state information report to be received by the UE after the transmission of the feedback message; and
    cancelling the first channel state information report and the second channel state information report based at least in part on receiving the control information.

12. A method for wireless communications at a first user equipment (UE), comprising:
    receiving, from a second UE over a sidelink channel, a first channel state information report, a second channel state information report, and a first transmission configuration indicator, wherein the first transmission configuration indicator is associated with a first transmission configuration indicator state;
    selecting at least one of the first channel state information report or the second channel state information report to be canceled based at least in part on receiving an indication associated with the first transmission configuration indicator;
    cancelling information included in at least one of the first channel state information report or the second channel state information report based at least in part on the selecting;
    receiving a data transmission based at least in part on the cancelling; and
    receiving a second transmission configuration indicator associated with a second transmission configuration indicator state;
    wherein cancelling information included in at least one of the first channel state information report or the second channel state information report comprises cancelling one or more portions of at least one of the first channel state information report or the second channel state information report based at least in part on the first transmission configuration indicator state and the second transmission configuration indicator state.

13. An apparatus for wireless communications at a first user equipment (UE), comprising:
    a processor;
    memory coupled with the processor; and
    instructions stored in the memory and executable by the processor to cause the apparatus to:

receive, from a second UE over a sidelink channel, a first channel state information report, a second channel state information report, and a first transmission configuration indicator;

select at least one of the first channel state information report or the second channel state information report to be canceled based at least in part on receiving an indication associated with the first transmission configuration indicator;

cancel information included in at least one of the first channel state information report or the second channel state information report based at least in part on the selecting; and receive a data transmission based at least in part on the cancelling, wherein the instructions to cancel information included in at least one of the first channel state information report or the second channel state information report are executable by the processor to cause the apparatus to: cancel the first channel state information report when the indication comprises the second channel state information report.

14. The apparatus of claim 13, wherein the instructions are further executable by the processor to cause the apparatus to:

transmit, to the second UE, a cancellation message that indicates that at least one of the first channel state information report or the second channel state information report is canceled.

15. The apparatus of claim 13, wherein the second channel state information report is associated with a channel state that is more recent than a channel state associated with the first channel state information report.

16. The apparatus of claim 13, wherein the first channel state information report and the second channel state information report are received within a duration of the first transmission configuration indicator.

17. The apparatus of claim 13, wherein the indication comprises a most-recently received indication.

18. The apparatus of claim 13, wherein the instructions are further executable by the processor to cause the apparatus to:

receive power control information associated with at least one of the first channel state information report or the second channel state information report, wherein receiving the data transmission is based at least in part on receiving the power control information.

19. The apparatus of claim 13, wherein the indication comprises a sidelink data transmission.

20. The apparatus of claim 13, wherein the indication comprises a sidelink feedback transmission.

21. The apparatus of claim 13, wherein:

the indication comprises a cancellation message that indicates that at least one of the first channel state information report or the second channel state information report is canceled; and cancelling the information is based at least in part on the cancellation message.

22. An apparatus for wireless communications at a first user equipment (UE), comprising:

a processor;
memory coupled with the processor; and
instructions stored in the memory and executable by the processor to cause the apparatus to:

receive, from a second UE over a sidelink channel, a first channel state information report, a second channel state information report, and a first transmission configuration indicator;

select at least one of the first channel state information report or the second channel state information report to be canceled based at least in part on receiving an indication associated with the first transmission configuration indicator;

cancel information included in at least one of the first channel state information report or the second channel state information report based at least in part on the selecting;

receive a data transmission based at least in part on the cancelling;

receive, from the second UE, a second transmission configuration indicator associated with the second channel state information report and a third transmission configuration indicator comprising information included in the first transmission configuration indicator; and cancel the second channel state information report, wherein the first channel state information report is associated with the first transmission configuration indicator and the indication comprises the third transmission configuration indicator.

23. An apparatus for wireless communications at a first user equipment (UE), comprising:

a processor;
memory coupled with the processor; and
instructions stored in the memory and executable by the processor to cause the apparatus to:

receive, from a second UE over a sidelink channel, a first channel state information report, a second channel state information report, and a first transmission configuration indicator;

select at least one of the first channel state information report or the second channel state information report to be canceled based at least in part on receiving an indication associated with the first transmission configuration indicator;

cancel information included in at least one of the first channel state information report or the second channel state information report based at least in part on the selecting;

receive a data transmission based at least in part on the cancelling;

schedule transmission of a feedback message to be transmitted after receiving the first channel state information report and the second channel state information report;

receive control information scheduling transmission of a third channel state information report to be received by the UE after the transmission of the feedback message; and cancel the first channel state information report and the second channel state information report based at least in part on receiving the control information.

24. An apparatus for wireless communications at a first user equipment (UE), comprising:

a processor;
memory coupled with the processor; and
instructions stored in the memory and executable by the processor to cause the apparatus to:

receive, from a second UE over a sidelink channel, a first channel state information report, a second channel state information report, and a first transmission configuration indicator, wherein the first transmission configuration indicator is associated with a first transmission configuration indicator state;

select at least one of the first channel state information report or the second channel state information report to be canceled based at least in part on receiving an indication associated with the first transmission configuration indicator;

cancel information included in at least one of the first channel state information report or the second channel state information report based at least in part on the selecting;

receive a data transmission based at least in part on the cancelling; and receive a second transmission configuration indicator associated with a second transmission configuration indicator state;

wherein the instructions to cancel information included in at least one of the first channel state information report or the second channel state information report comprise cancelling one or more portions of at least one of the first channel state information report or the second channel state information report based at least in part on the first transmission configuration indicator state and the second transmission configuration indicator state.

25. An apparatus for wireless communications at a first user equipment (UE), comprising:

means for receiving, from second UE over a sidelink channel, a first channel state information report, a second channel state information report, and a first transmission configuration indicator;

means for selecting at least one of the first channel state information report or the second channel state information report to be canceled based at least in part on receiving an indication associated with the first transmission configuration indicator;

means for cancelling information included in at least one of the first channel state information report or the second channel state information report based at least in part on the selecting, wherein cancelling information included in at least one of the first channel state information report or the second channel state information report comprises: cancelling the first channel state information report when the indication comprises the second channel state information report; and means for receiving a data transmission based at least in part on the cancelling.

26. The apparatus of claim 25, further comprising:

means for transmitting, to the second UE, a cancellation message that indicates that at least one of the first channel state information report or the second channel state information report is canceled.

27. A non-transitory computer-readable medium storing code for wireless communications at a first user equipment (UE), the code comprising instructions executable by a processor to:

receive, from second UE over a sidelink channel, a first channel state information report, a second channel state information report, and a first transmission configuration indicator;

select at least one of the first channel state information report or the second channel state information report to be canceled based at least in part on receiving an indication associated with the first transmission configuration indicator;

cancel information included in at least one of the first channel state information report or the second channel state information report based at least in part on the selecting; and receive a data transmission based at least in part on the cancelling, wherein the instructions to cancel information included in at least one of the first channel state information report or the second channel state information report are executable by the processor to cause the apparatus to: cancel the first channel state information report when the indication comprises the second channel state information report.

28. The non-transitory computer-readable medium of claim 27, wherein the instructions are further executable by the processor to:

transmit, to the second UE, a cancellation message that indicates that at least one of the first channel state information report or the second channel state information report is canceled.

* * * * *